Sept. 12, 1961  G. KESSLER  2,999,673
LIQUID MIXING MEANS
Filed Aug. 5, 1959
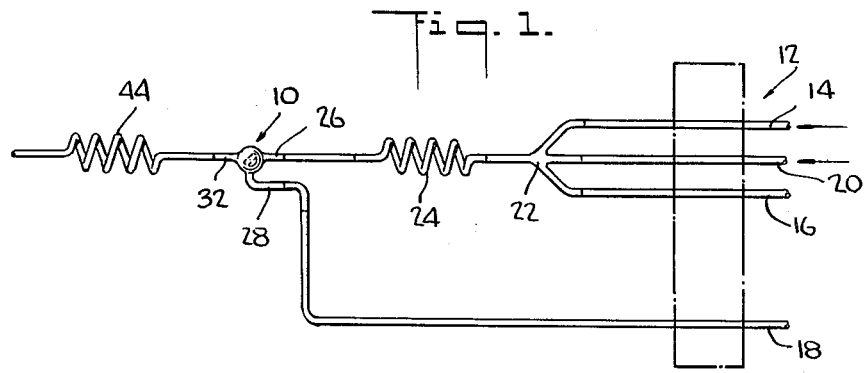
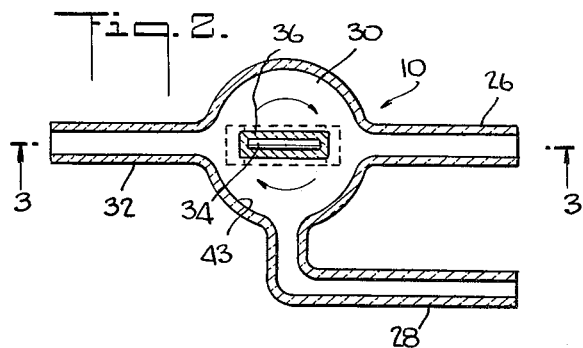
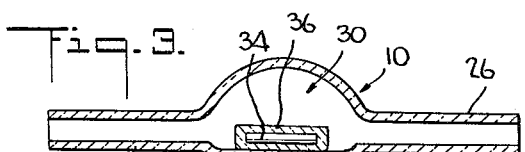
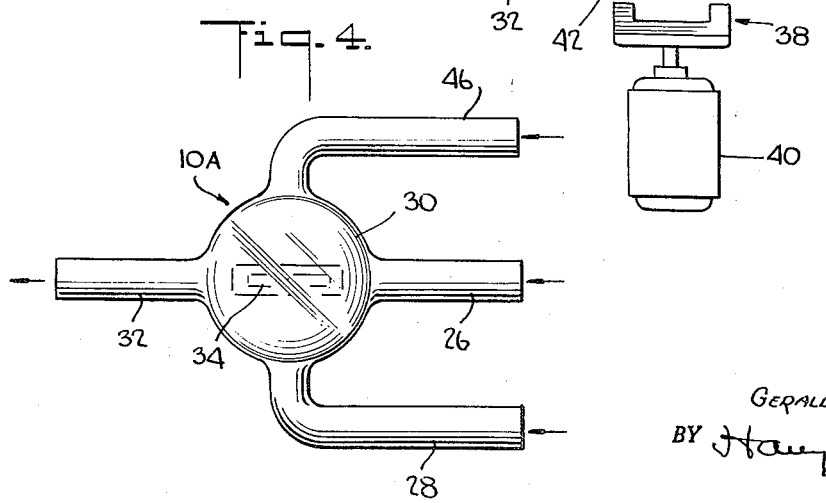
INVENTOR.
GERALD KESSLER
BY Harry Cohen
ATTORNEY

United States Patent Office 2,999,673
Patented Sept. 12, 1961

2,999,673
LIQUID MIXING MEANS
Gerald Kessler, Tarrytown, N.Y., assignor to Technicon Instruments Corporation, Chauncey, N.Y., a corporation of New York
Filed Aug. 5, 1959, Ser. No. 831,860
5 Claims. (Cl. 259—7)

This invention relates to means for intermixing a plurality of flowing liquids which are brought together in the form of initially separate streams of said liquids, respectively.

In the treatment of various liquids for analysis or other purposes it is necessary when adding one liquid to another to stir or mix them immediately in order to prevent precipitation of a substance therein, or for some other reason. For example, in cholesterol determinations according to which blood serum is diluted with glacial acetic acid and a color reagent, such as ferric chloride in concentrated sulphuric acid, is added to said diluted serum, for treating the serum for colorimetric analysis, precipitation of protein from the serum occurs unless the liquids are intermixed thoroughly at the time of adding the color reagent to the serum. Such mixing can be accomplished without serious difficulty when the determinations are performed separately on the various specimens, as distinguished from a continuous automatic analysis system of the type described in the U.S. Patent to Skeggs, No. 2,879,141 issued to the assignee of the present application. According to said patent, successive specimens of a liquid are treated for colorimetric analysis automatically while they flow one after another through a conduit or tubular passages. In performing cholesterol determinations, it is important to keep the protein in solution because cholesterol is complexed with the protein and if protein is lost, for example by adhering to tube walls, some of the cholesterol is lost along with the lost protein. Moreover, if some of the protein of one sample is precipitated and adheres to the tube wall or other parts of the apparatus, contamination of the successive samples would occur.

The primary object of this invention, therefore, is to provide means operable to thoroughly and quickly intermix a plurality of liquids while they flow through part of a conduit into which they are introduced in the form of initially separate streams. More specifically stated, this object of the invention is to accomplish the intermixing of successive increments of the liquid streams at the confluence of said streams in the conduit so that the liquids are intermixed immediately, i.e., at the time they are brought together in the conduit.

The above and other objects, features and advantages of the invention will be fully understood from the following description considered in connection with the accompanying illustrative drawings, in which:

FIG. 1 is a schematic view of part of a liquid treating apparatus provided with the liquid-mixing means of the present invention;

FIG. 2 is an enlarged horizontal sectional view of the liquid mixing means, provided with two inlets;

FIG. 3 is a vertical sectional view on the line 3—3 of FIG. 2, showing the motor drive for the mixing device; and FIG. 4 is an enlarged top plan view of the liquid mixing means of the invention provided with three inlets.

Referring now to the drawings in detail, FIG. 1 shows the liquid mixing means 10 provided in apparatus which includes a proportioning pump 12 which transmits liquids through the pump tubes 14, 16 and 18 in predetermined relative proportions, and which introduces air or other inert gas through pump tube 20 into the liquid stream at the fitting 22, for dividing said liquid stream into successive segments of liquid separated from each other by intervening segments of the inert gas. The liquids which are transmitted by pump tubes 14 and 16 flow from the fitting 22 through a helical mixing coil 24 and from said mixing coil to the inlet 26 of the mixing means 10, and the liquid which is transmitted by pump tube 18 flows to the inlet 28 of said mixing means.

The liquid mixing means 10 is preferably in the form of a glass bulb to provide a mixing chamber 30, formed of non-magnetic material, and the tubular parts integral therewith which provide said inlets 26 and 28 and an outlet 32 for the stream of liquids which are intermixed in said chamber. A magnetic mixer comprising a bar 34 of iron or other magnetic material sealed within a glass envelope is disposed in chamber 30 and is freely rotatable therein. A magnet 38 rotated by an electric motor 40 and positioned adjacent the bottom 42 of chamber 30 is operable to rotate bar 34 in said chamber for mixing the liquids as soon as they come together in said chamber. The bottom 42 of chamber 30 is preferably flat for support in horizontal position and the inner peripheral side wall 43 of said chamber is circular and its inner diameter is slightly greater than mixer bar 34, 36. It will be noted that the magnetic mixer rotates adjacent the liquid inlets and is therefore effective to intermix successive increments of the liquid streams at their confluence in chamber 30. The stream which flows through outlet 32 is composed of segments of the intermixed liquids, said segments being separated from each other by the intervening segments of the inert gas transmitted through the pump 20 as described above. The outlet 32 is preferably connected to a glass mixing coil 44 which is provided in the flow system of the apparatus. Obviously, the volume of chamber 30 in relation to the rates of flow of the incoming streams and the shape of the chamber are such as to prevent entrapment of the incoming gas segments in the chamber, whereby a segmented stream of the intermixed liquids is formed.

As illustrated in FIG. 4, a liquid-mixing means 10A of this invention may have more than two liquid inlets. Thus as here shown, there is an inlet 46 in addition to the inlets 26 and 28 so that the device can be used for intermixing three liquids at their confluence in chamber 30.

As an illustrative, but not limitative, example of the use of the mixing means of the present invention, in the case of cholesterol determinations, the blood serum is introduced by pump tube 14 and the glacial acetic acid for diluting the sample is introduced by pump tube 16, and the stream of these liquids is segmented by air introduced at fitting 22 by pump tube 20. The liquid segments are mixed in the coil 24 and the resulting stream of diluted serum flows into the chamber 30, through inlet 26, simultaneously with the flow of the color reagent, which is transmitted by the pump tube 18 to the inlet 28, into said chamber. It will be understood, however, that the liquid-mixing means of the present invention may be used for mixing various other liquids for various other purposes.

The proportioning pump 12 may be of any suitable type. Preferably said pump is of the type described in U.S. Patent No. 2,893,324, issued to the assignee of the present application.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What I claim is:
1. In a fluid flow system having a supply tube for the flow therethrough of a segmented stream comprising a series of liquid segments separated from each other by an intervening segment of an inert gas and another supply tube for the flow therethrough of a stream of another liquid, and a delivery tube; a device for intermixing successive portions of the liquid of said segmented stream and successive portions of said other liquid during the flow of said streams, comprising a chamber having a non-magnetic wall and positioned between said supply tubes and said delivery tube at the confluence of said streams, said chamber having an inlet for each of said streams connected to said supply tubes, respectively, and an outlet for the intermixed liquids connected to said delivery tube, said chamber being closed except at said inlets and said outlet and having a volume in relation to the rates of flow of the incoming streams and a shape which prevent the entrapment of the incoming gas segments in said chamber, whereby the outgoing stream of intermixed liquids comprises a series of segments of the intermixed liquids separated from each other by an intervening segment of the inert gas, and a magnetic mixer member disposed in said chamber and freely movable therein by magnetic action through said non-magnetic wall of the chamber for intermixing the liquids during the flow thereof through said chamber.

2. In a fluid flow system having a supply tube for the flow therethrough of a segmented stream comprising a series of liquid segments separated from each other by an intervening segment of an inert gas and another supply tube for the flow therethrough of a stream of another liquid, and a delivery tube; a device for intermixing successive portions of the liquid of said segmented stream and successive portions of said other liquid during the flow of said streams, comprising a glass bulb positioned between said supply tubes and said delivery tube at the confluence of said streams, said glass bulb having an inlet for each of said streams connected to said supply tubes, respectively, and an outlet for the intermixed liquids connected to said delivery tube, said inlets and outlet comprising tubular parts integral with said glass bulb, said glass bulb being closed except at said inlets and outlet and having a volume in relation to the rates of flow of the incoming streams and a shape which prevent the entrapment of the incoming gas segments in said chamber, whereby the outgoing stream of intermixed liquids comprises a series of segments of the intermixed liquids separated from each other by an intervening segment of the inert gas, said glass bulb having a horizontal bottom for supporting said device on a horizontal surface, a magnetic mixer member disposed within said glass bulb and freely movable therein in a horizontal plane by magnetic action through the wall of said glass bulb for intermixing the liquids during the flow thereof through said glass bulb, and means for transmitting said liquids in predetermined relative proportions to said glass bulb through said inlets thereof.

3. In a fluid flow system having a supply tube for the flow therethrough of a segmented stream comprising a series of liquid segments separated from each other by an intervening segment of an inert gas and another supply tube for the flow therethrough of a stream of another liquid, and a delivery tube; a device for intermixing successive portions of the liquid of said segmented stream and successive portions of said other liquid during the flow of said streams, comprising a glass bulb positioned between said supply tubes and said delivery tube at the confluence of said streams, said glass bulb having an inlet for each of said streams connected to said supply tubes, respectively, and an outlet for the intermixed liquids connected to said delivery tube, said inlets and outlet comprising tubular parts integral with said glass bulb, said glass bulb being closed except at said inlets and outlet and having a volume in relation to the rates of flow of the incoming streams and a shape which prevent the entrapment of the incoming gas segments in said chamber, whereby the outgoing stream of intermixed liquids comprises a series of segments of the intermixed liquids separated from each other by an intervening segment of the inert gas, said glass bulb having a horizontal bottom for supporting said device on a horizontal surface, and a magnetic mixer member disposed within said glass bulb and freely movable therein in a horizontal plane by magnetic action through the wall of said glass bulb for intermixing the liquids during the flow thereof through said glass bulb.

4. A device for intermixing successive portions of a segmented stream comprising a series of liquid segments separated from each other by an intervening segment of an inert gas and successive portions of a stream of another liquid, comprising a mixing chamber having a wall of non-magnetic material and adapted to be positioned at the confluence of said streams, said chamber having an inlet for each of said streams and an outlet for the intermixed liquids, said chamber being closed except at said inlets and said outlet and having a volume in relation to the rates of flow of the incoming streams and a shape which prevent the entrapment of the incoming gas segments in said chamber, whereby the outgoing stream of intermixed liquids comprises a series of segments of the intermixed liquids separated from each other by an intervening segment of the inert gas, and a magnetic mixer member disposed in said chamber and freely movable therein by magnetic action through said non-magnetic wall of the chamber for intermixing the liquids during the flow thereof through said chamber.

5. A device for intermixing successive portions of a segmented stream comprising a series of liquid segments separated from each other by an intervening segment of an inert gas and successive portions of a stream of another liquid, comprising a glass bulb adapted to be positioned at the confluence of said streams, said glass bulb having an inlet for each of said streams and an outlet for the intermixed liquids, said inlets and outlet comprising tubular parts integral with said glass bulb, said glass bulb being closed except at said inlets and outlet and having a volume in relation to the rates of flow of the incoming streams and a shape which prevent the entrapment of the incoming gas segments in said chamber, whereby the outgoing stream of intermixed liquids comprises a series of segments of the intermixed liquids separated from each other by an intervening segment of the inert gas, said glass bulb having a horizontal bottom for supporting said device on a horizontal surface, and a magnetic mixer member disposed within said glass bulb and freely movable therein in a horizontal plane by magnetic action through the wall of said glass bulb for intermixing the liquids during the flow thereof through said glass bulb.

References Cited in the file of this patent

UNITED STATES PATENTS

| | | |
|---|---|---|
| 1,436,009 | Butterfield | Nov. 21, 1922 |
| 2,000,953 | Hooker et al. | May 14, 1935 |
| 2,230,255 | Laumiet et al. | Feb. 4, 1941 |
| 2,350,534 | Rosinger | June 6, 1944 |
| 2,773,747 | King et al. | Dec. 11, 1956 |
| 2,784,948 | Pahl et al. | Mar. 12, 1957 |
| 2,797,149 | Skeggs | June 25, 1957 |
| 2,899,280 | Whitehead et al. | Aug. 11, 1959 |

FOREIGN PATENTS

| | | |
|---|---|---|
| 991,941 | France | of 1951 |